US007754827B2

(12) United States Patent
Weikard et al.

(10) Patent No.: US 7,754,827 B2
(45) Date of Patent: Jul. 13, 2010

(54) COATED FILMS

(75) Inventors: Jan Weikard, Odenthal (DE); Wolfgang Fischer, Meerbusch (DE); Diethelm Rappen, Rheinberg (DE); Nicolas Stoeckel, Cologne (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/002,909

(22) Filed: Dec. 19, 2007

(65) Prior Publication Data

US 2008/0102215 A1 May 1, 2008

Related U.S. Application Data

(62) Division of application No. 11/603,817, filed on Nov. 22, 2006, now abandoned.

(30) Foreign Application Priority Data

Nov. 29, 2005 (DE) ...................... 10 2005 057 245

(51) Int. Cl.
*C08G 18/00* (2006.01)
*C08F 283/00* (2006.01)

(52) U.S. Cl. ....................................... 525/452; 525/509

(58) Field of Classification Search ................. 525/452, 525/509
See application file for complete search history.

(56) References Cited

U.S. PATENT DOCUMENTS

| | | | | |
|---|---|---|---|---|
| 5,912,081 | A | 6/1999 | Negele et al. | 428/423.1 |
| 6,221,439 | B1 | 4/2001 | Negele et al. | 427/514 |
| 6,500,876 | B2 | 12/2002 | Weikard et al. | 522/92 |
| 6,596,390 | B1 | 7/2003 | Negele et al. | 428/343 |
| 6,777,089 | B1 * | 8/2004 | Koniger et al. | 428/421 |
| 2001/0038917 | A1 | 11/2001 | Weikard et al. | 428/423.1 |
| 2003/0203194 | A1 | 10/2003 | Negele et al. | 428/343 |
| 2004/0224162 | A1 | 11/2004 | Königer et al. | 428/411.1 |

* cited by examiner

*Primary Examiner*—William K Cheung
(74) *Attorney, Agent, or Firm*—Robert S. Klemz; Noland J. Cheung

(57) ABSTRACT

The invention relates to novel coated post-formable films, to surface-coating compositions for such films, to a combined method for curing the surface-coating compositions and for post-forming, as well as to molded bodies produced from the coated films.

2 Claims, No Drawings

COATED FILMS

CROSS REFERENCE TO RELATED PATENT APPLICATION

The present application is a divisional application which is entitled to the right of priority under 35 U.S.C. §121 of U.S. patent application Ser. No. 11/603,187, filed Nov. 22, 2006 now abandoned.

FIELD OF THE INVENTION

The invention relates to novel coated post-formable films, to surface-coating compositions for such films, to a combined method for curing the surface-coating compositions and for post-forming, as well as to moulded bodies produced from the coated films.

BACKGROUND OF THE INVENTION

Methods are known in which a plastics film is first coated over a large area, is then wound onto rolls for the purpose of transportation or storage, and is subsequently brought into the desired final form on site. Such a procedure would be of particular interest if the surface already exhibited the required properties, such as fastness and appearance, directly after forming without further coatings. This concept offers great potential in the manufacture, for example, of add-on parts for motor vehicles by plastics processors, where the more complex step of coating three-dimensional components could be replaced by the more simple coating of a flat substrate. In addition, by using uniform coated films it is possible to avoid the problem, which occurs frequently in the separate coating (so-called offline coating) of add-on parts for motor vehicles, that the colour of the respective surface-coating layers is not identical (colour matching).

In general, good surface properties require a high crosslinking density of the coating. However, high crosslinking densities lead to duromeric behaviour with maximum possible degrees of stretch of only a few percent, so that cracks tend to form in the coating during the forming operation. This obvious conflict between the required high crosslinking density and the desired high degree of stretch can be resolved in different ways, for example by carrying out curing in two steps, before and after forming.

This can be effected, for example, by drying/curing according to two different mechanisms.

EP-A 0 819 516 describes a method of coating an object during a forming operation by means of a formable, radiation-curable coated film. This method has the disadvantage that, owing to the low glass transition temperature, the coated film does not have adequate block resistance before forming and after-curing. This impairs considerably the handling thereof prior to final curing and is a major disadvantage for industrial application because, for example, such films cannot be rolled up or can be rolled up only with the use of protective films, because otherwise they stick together. In addition, apart from the glass transition temperature and the naming of polymer classes ("phosphazenes, urethanes, acrylates"), this prior art does not indicate what properties the components of a surface-coating system should have in order to permit thermoplastic formability and duromeric behaviour, in particular fastness to weathering and scratching after final curing. In addition, there is no mention of the degrees of stretch that can be achieved.

WO 00/63015 likewise describes a coated formable film which can be cured by means of radiation. Improved block resistance prior to forming is achieved by the addition of polymeric components having a glass transition temperature above 40° C. Although two-stage curing is mentioned ("Moreover, the radiation-curable composition can comprise, in addition to radiation-curable compounds, also compounds that contribute to curing by other chemical reactions"), no reproducible description is given of how such systems can be prepared. Furthermore: In the preparative description there is an inconsistency between the preparation temperature of the radiation-curable coating in the melt of the polymeric component "at 160° C." and the thermal curing which is later to be carried out on the substrate at "up to 150° C., preferably up to 130° C.".

In summary, it is found that the prior art does not disclose surface-coating systems for the coating of a post-formable film that fulfil the following requirements:
1) simple application by conventional methods to a film or a film composite,
2) thermal curing via a polyaddition mechanism which results in a block-resistant thermoplastic coated film that can be post-formed using appropriate tools,
3) final curing of the surface coating on the formed, coated film by radiation, the fastness properties of the coating that are achieved being comparable with those which can be obtained by conventional surface coating of already formed objects.

SUMMARY OF THE INVENTION

The present invention provides coating systems that meet these requirements.

It has been found that corresponding coated films having a degree of stretch greater than 50% can be produced by coating with chosen so-called dual cure surface-coating systems, which cure partially before forming by polyaddition of constituents that are as linear as possible and after forming cure fully by radiation.

The invention accordingly also provides a coated, post-formable film consisting of a substrate film and at least one coating formed from a surface-coating composition according to the invention. The invention further provides a combined method for curing the surface-coating compositions and for post-forming, the use thereof, and moulded bodies produced from the coated films.

The surface-coating compositions according to the invention for the production of post-formable substrates, which are cured by means of polyaddition reaction to form a block-resistant and thermoplastic layer and are finally cured by subsequent polymerisation initiated by actinic radiation, are characterised in that:
  no component within the scope of the polyaddition reaction has a mean functionality greater than 2.8, and
  a degree of stretch of at least 50% can be achieved without crack formation occurring.

The surface-coating compositions according to the invention can be used either 100% solid or liquid dissolved in organic solvents or dissolved and/or emulsified in aqueous phase.

The surface-coating compositions according to the invention comprise:
A) one or more compounds containing at least one chemical function a) suitable for polyaddition with component B) and different from b), which compounds
  A1) do not contain ethylenically unsaturated double bonds and/or
  A2) contain ethylenically unsaturated double bonds and B) one or more compounds containing at least one chemical function b) suitable for polyaddition with component A) and different from a), which compounds B1) do not contain ethylenically unsaturated double bonds and/or B2) contain ethylenically unsaturated double bonds, wherein at least one of components A and B must contain ethylenically unsaturated double bonds, and optionally C) ethylenically unsaturated compounds that do not contain chemical functions suitable for polyaddition, D) photoinitiators, E) additives such as stabilisers, catalysts and other auxiliary substances and additives, F) non-functional polymers and/or fillers.

DETAILED DESCRIPTION OF THE INVENTION

Suitable chemical functions a) and b) for the polyaddition are in principle any functions (chemical moieties) conventionally used in coating technology. Isocyanate-hydroxyl/thiol/amine, carboxylate-epoxide, melamine-hydroxyl and carbamate-hydroxyl are particularly suitable. As function a), very particular preference is given to isocyanates, also in blocked form, and as function b) very particular preference is given to hydroxyl, primary and/or secondary amines and asparaginate.

As isocyanates A) there are used aromatic, araliphatic, aliphatic and cycloaliphatic di- or poly-isocyanates. It is also possible to use mixtures of such di- or poly-isocyanates. Examples of suitable di- or poly-isocyanates are butylene diisocyanate, hexamethylene diisocyanate (HDI), isophorone diisocyanate (IPDI), 2,2,4- and/or 2,4,4-trimethylhexamethylene diisocyanate, the isomers of bis(4,4'-isocyanatocyclohexyl)methane and mixtures thereof having any desired isomer content, isocyanatomethyl-1,8-octane diisocyanate, 1,4-cyclohexylene diisocyanate, the isomers of cyclohexanedimethylene diisocyanate, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane-4,4',4"-triisocyanate or derivatives thereof having a urethane, urea, carbodiimide, acylurea, isocyanurate, allophanate, biuret, oxadiazinetrione, uretdione, iminooxadiazinedione structure and mixtures thereof. Preference is given to polyisocyanates based on oligomerised and/or derivatised diisocyanates which have been freed of excess diisocyanate by suitable processes, in particular those of hexamethylene diisocyanate, isophorone diisocyanate and the isomers of bis(4,4'-isocyanatocyclohexyl)methane and mixtures thereof. Preference is given to the oligomeric isocyanurates, uretdiones, allophanates and iminooxadiazinediones of HDI, of IPDI and/or of the isomers of bis(4,4'-isocyanatocyclohexyl)methane and mixtures thereof. Particular preference is given to the oligomeric isocyanurates, uretdiones and allophanates of IPDI and to the oligomeric isocyanurates of the isomers of bis(4,4'-isocyanatohexyl)methane.

It is optionally also possible to use the above-mentioned isocyanates A) partially reacted with isocyanate-reactive ethylenically unsaturated compounds. There are used for this purpose preferably α,β-unsaturated carboxylic acid derivatives, such as acrylates, methacrylates, maleates, fumarates, maleimides, acrylamides, as well as vinyl ethers, propenyl ethers, allyl ethers and dicyclopentadienyl-unit-containing compounds which have at least one group reactive towards isocyanates; these are particularly preferably acrylates and methacrylates having at least one isocyanate-reactive group. There come into consideration as hydroxy-functional acrylates or methacrylates, for example, compounds such as 2-hydroxyethyl (meth)acrylate, polyethylene oxide mono(meth)acrylates, polypropylene oxide mono(meth)acrylates, polyalkylene oxide mono(meth)acrylates, poly("epsilon"-caprolactone) mono(meth)acrylates, such as, for example, Tone® M100 (Dow, USA), 2-hydroxypropyl (meth)acrylate, 4-hydroxybutyl (meth)acrylate, 3-hydroxy-2,2-dimethylpropyl (meth)acrylate, the hydroxy-functional mono-, di- or tetra-(meth)acrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or commercial mixtures thereof. In addition, isocyanate-reactive oligomeric or polymeric unsaturated acrylate and/or methacrylate-group-containing compounds, on their own or in combination with the above-mentioned monomeric compounds, are suitable.

It is optionally also possible to use the above-mentioned isocyanates A) partially reacted with blocking agents known to the person skilled in the art from coating technology. Examples of blocking agents which may be mentioned include: alcohols, lactams, oximes, malonic esters, alkyl acetoacetates, triazoles, phenols, imidazoles, pyrazoles and amines, such as, for example, butanoneoxime, diisopropylamine, 1,2,4-triazole, dimethyl-1,2,4-triazole, imidazole, malonic acid diethyl ester, acetic acid ester, acetone oxime, 3,5-dimethylpyrazole, epsilon-caprolactam, N-tert-butylbenzylamine, cyclopentanone carboxyethyl ester or any desired mixtures of these blocking agents.

The mean number of functional groups a), that is to say, for example, of isocyanate groups, per molecule (functionality) of component A) that is used is in each case <2.8, preferably from 1.5 to 2.5, particularly preferably from 1.8 to 2.1.

As compounds of component A1) there can be used any of the above-mentioned di- or poly-isocyanates A), individually or in any desired mixtures, that do not contain ethylenically unsaturated functions.

As compounds of component A2) there can be used any of the above-mentioned compounds A), individually or in any desired mixtures, that has at least one isocyanate group and in addition at least one ethylenically unsaturated function which reacts with ethylenically unsaturated compounds under the action of actinic radiation, with polymerisation.

Isocyanate-reactive compounds B) are monomeric, oligomeric or polymeric compounds as well as mixtures of one or more of those compounds.

Suitable compounds of component B) are low molecular weight, short-chained, i.e. containing from 2 to 20 carbon atoms, aliphatic, araliphatic or cycloaliphatic diols, triols and/or higher polyols. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, position-isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropionic acid (2,2-dimethyl-3-hydroxypropyl ester). Examples of suitable triols are trimethylolethane, trimethylolpropane or glycerol. Suitable higher functional alcohols are ditrimethylolpropane, pentaerythritol, dipentaerythritol or sorbitol. Preference is given to aliphatic diols, very particularly preferably cycloaliphatic diols.

Also suitable are higher molecular weight aliphatic and cycloaliphatic polyols, such as polyester polyols, polyether polyols, polycarbonate polyols, hydroxy-functional acrylic resins, hydroxy-functional polyurethanes, hydroxy-functional epoxy resins or corresponding hybrids (see Römpp Lexikon Chemie, p. 465-466, 10th Ed. 1998, Georg-Thieme-Verlag, Stuttgart). Preference is given to (cyclo)aliphatic polyester polyols and/or (cyclo)aliphatic polycarbonate polyols, with very particular preference being given to those polyester and/or polycarbonate polyols that contain branched linear aliphatic diols.

It is further possible to use as compounds of component B) any compounds, individually or in any desired mixtures, that contain at least one group reactive towards isocyanates and at least one unsaturated function which reacts with ethylenically unsaturated compounds under the action of actinic radiation, with polymerisation.

Preference is given to the use of α,β-unsaturated carboxylic acid derivatives, such as acrylates, methacrylates, maleates, fumarates, maleimides, acrylamides, as well as vinyl ethers, propenyl ethers, allyl ethers and dicyclopentadienyl-unit-containing compounds which have at least one group reactive towards isocyanates; these are particularly preferably acrylates and methacrylates having at least one isocyanate-reactive group.

Also suitable are hydroxy-functional acrylates or methacrylates, for example, compounds such as 2-hydroxyethyl (meth)acrylate, polyethylene oxide mono(meth)acrylates, polypropylene oxide mono(meth)acrylates, polyalkylene oxide mono(meth)acrylates, poly(ϵ-caprolactone) mono (meth)acrylates, such as, for example, Tone® M100 (Dow, Schwalbach, DE), 2-hydroxypropyl (meth)acrylate, 4-hydroxybutyl (meth)acrylate, 3-hydroxy-2,2-dimethylpropyl (meth)acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or commercial mixtures thereof.

In addition, isocyanate-reactive oligomeric or polymeric unsaturated acrylate and/or methacrylate group-containing compounds, on their own or in combination with the above-mentioned monomeric compounds, are suitable.

The preparation of polyester acrylates is described in DE-A 4 040 290 (p. 3, 1.25-p. 6, 1.24), DE-A 3 316 592 (p. 5, 1.14-p. 11, 1.30) and P. K. T. Oldring (Ed.), Chemistry & Technology of UV & EB Formulations For Coatings, Inks & Paints, Vol. 2, 1991, SITA Technology, London, p. 123-135.

It is likewise possible to use the hydroxyl-group-containing epoxy (meth)acrylates having OH contents of from 20 to 300 mg KOH/g or hydroxyl-group-containing polyurethane (meth)acrylates having OH contents of from 20 to 300 mg KOH/g or acrylated polyacrylates having OH contents of from 20 to 300 mg KOH/g, in each case known per se, as well as mixtures thereof with one another and mixtures with hydroxyl-group-containing unsaturated polyesters and also mixtures with polyester (meth)acrylates or mixtures of hydroxyl-group-containing unsaturated polyesters with polyester (meth)acrylates. Such compounds are likewise described in P. K. T. Oldring (Ed.), Chemistry & Technology of UV & EB Formulations For Coatings, Inks and Paints, Vol. 2, 1991, SITA Technology, London p. 37-56. Polyester acrylates having defined hydroxy functionality are preferred.

Hydroxyl-group-containing epoxy (meth)acrylates are based in particular on reaction products of acrylic acid and/or methacrylic acid with epoxides (glycidyl compounds) of monomeric, oligomeric or polymeric bisphenol A, bisphenol F, hexanediol and/or butanediol or their ethoxylated and/or propoxylated derivatives. Preference is further given to epoxy acrylates having defined functionality, such as those from the reaction of an optionally unsaturated dioic acid, such as fumaric acid, maleic acid, hexahydrophthalic acid or adipic acid, and glycidyl (meth)acrylate. Aliphatic epoxy acrylates are particularly preferred. Acrylated polyacrylates can be prepared, for example, by reaction of glycidyl-functional polyacrylates with (meth)acrylic acid.

The isocyanate-reactive component B) has on average not more than 2.6, preferably from 2.3 to 1.7, particularly preferably from 2.1 to 1.85, isocyanate-reactive groups per molecule.

As compounds of component B1) there can be used any of the above-mentioned isocyanate-reactive compounds B), individually or in any desired mixtures, that do not contain ethylenically unsaturated functions.

As compounds of component B2) there can be used any of the above-mentioned compounds B), individually or in any desired mixtures, that contain at least one isocyanate-reactive group and additionally at least one ethylenically unsaturated function which reacts with ethylenically unsaturated compounds under the action of actinic radiation, with polymerisation.

As component C) there are suitable one or more monomeric or polymeric compounds that carry at least one functional group, that react with ethylenically unsaturated compounds under the action of actinic radiation, with polymerisation, and that contain neither isocyanate groups nor isocyanate-reactive groups. Such compounds are, for example, esters, carbonates, acrylates, ethers, urethanes or amides or polymeric compounds of those structural types. It is also possible to use any desired mixtures of such monomers and/or polymers that contain at least one group polymerisable under the action of actinic radiation.

As compounds of component C) there can be used modified monomers or polymers, the modification of which is effected by methods known per se. In the modification, appropriate chemical functionalities are introduced into the molecules. There are suitable α,β-unsaturated carboxylic acid derivatives, such as acrylates, methacrylates, maleates, fumarates, maleimides, acrylamides, also vinyl ethers, propenyl ethers, allyl ethers and dicyclopentadienyl-unit-containing compounds. Vinyl ethers, acrylates and methacrylates are preferred, and acrylates are particularly preferred. Examples include the reactive diluents known in the technology of radiation curing (see Römpp Lexikon Chemie, p. 491, 10th Ed. 1998, Georg-Thieme-Verlag, Stuttgart) or the binders known in the technology of radiation curing, such as polyether acrylates, polyester acrylates, urethane acrylates, epoxy acrylates, melamine acrylates, silicone acrylates, polycarbonate acrylates and acrylated polyacrylates.

Suitable esters are conventionally obtained by esterification of alcohols having from 2 to 20 carbon atoms, preferably polyhydric alcohols having from 2 to 20 carbon atoms, with unsaturated acids or unsaturated acid chlorides, preferably acrylic acid and derivatives thereof. To that end, the esterification methods known to the person skilled in the art can be used.

Suitable alcohol components in the esterification are monohydric alcohols, such as the isomers of butanol, pentanol, hexanol, heptanol, octanol, nonanol and decanol, also cycloaliphatic alcohols, such as isobornol, cyclohexanol and alkylated cyclohexanols, dicyclopentanol, arylaliphatic alcohols, such as phenoxyethanol and nonylphenylethanol, as well as tetrahydrofurfuryl alcohols. Also suitable are dihydric alcohols, such as ethylene glycol, 1,2-propanediol, 1,3-propanediol, diethylene glycol, dipropylene glycol, the isomers of butanediol, neopentyl glycol, 1,6-hexanediol, 2-ethylhexanediol, 1,4-cyclohexanediol, 1,4-cyclohexanedimethanol and tripropylene glycol. Suitable higher hydric alcohols are glycerol, trimethylolpropane, ditrimethylolpropane, pentaerythritol or dipentaerythritol. Preference is given to diols and higher hydric alcohols, particular preference being given to glycerol, trimethylolpropane, pentaerythritol, dipentaerythritol and 1,4-cyclohexanedimethanol.

Suitable esters and urethanes are, for example, also obtainable by reaction of unsaturated OH-functional, unsaturated compounds having from 2 to 12 carbon atoms, preferably from 2 to 4 carbon atoms, with acids, esters, acid anhydrides or acid chlorides or isocyanates.

There come into consideration as hydroxy-functional acrylates or methacrylates, for example, compounds such as 2-hydroxyethyl (meth)acrylate, polyethylene oxide mono(meth) acrylates, polypropylene oxide mono(meth)acrylates, polyalkylene oxide mono(meth)acrylates, poly(ε-caprolactone) mono(meth)acrylates, such as, for example, Tone® M100 (Dow, Schwalbach, DE), 2-hydroxypropyl (meth) acrylate, 4-hydroxybutyl (meth)acrylate, 3-hydroxy-2,2-dimethylpropyl (meth)acrylate, the hydroxy-functional mono-, di- or tetra-acrylates of polyhydric alcohols such as trimethylolpropane, glycerol, pentaerythritrol, dipentaerythritol, ethoxylated, propoxylated or alkoxylated trimethylolpropane, glycerol, pentaerythritol, dipentaerythritol or commercial mixtures thereof.

Examples of preferred unsaturated OH-functional compounds are hydroxyethyl (meth)acrylate, 2- and 3-hydroxypropyl (meth)acrylate, 2-, 3- and 4-hydroxybutyl (meth) acrylate, also OH-functional vinyl ethers, such as, for example, hydroxybutyl vinyl ether, and mixtures thereof.

It is further possible to use as OH-functional unsaturated compounds OH-functional (meth)acrylic acid esters or amides, which are obtainable by reaction of up to n−1 equivalents of (meth)acrylic acid with n-hydric alcohols, amines, amino alcohols and/or mixtures thereof. Suitable n-hydric alcohols are glycerol, trimethylolpropane and/or pentaerythritol.

Products from the reaction of epoxy-functional (meth) acrylic acid esters with (meth)acrylic acid can likewise be used. For example, the reaction of glycidyl methacrylate with acrylic acid yields a mixed acrylic acid-methacrylic acid ester of glycerol, which can be used particularly advantageously.

Mono-, di- or poly-isocyanates can be used for the preparation of urethanes from those OH-functional unsaturated compounds. There are suitable for that purpose the isomers of butyl isocyanate, butylene diisocyanate, hexamethylene diisocyanate (HDI), isophorone diisocyanate (IPDI), 2,2,4- and/or 2,4,4-trimethylhexamethylene diisocyanate, the isomers of bis(4,4'-isocyanatocyclohexyl)methane or mixtures thereof having any desired isomer content, isocyanatomethyl-1,8-octane diisocyanate, 1,4-cyclohexylene diisocyanate, the isomers of cyclohexanedimethylene diisocyanate, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane-4,4',4"-triisocyanate or derivatives thereof having a urethane, urea, carbodiimide, acylurea, isocyanurate, allophanate, biuret, oxadiazinetrione, uretdione, iminooxadiazinedione structure and mixtures thereof. Preference is given to polyisocyanates based on oligomerised and/or derivatised diisocyanates which have been freed of excess diisocyanate by suitable processes, in particular those of hexamethylene diisocyanate, isophorone diisocyanate and the isomers of bis(4,4'-isocyanatocyclohexyl)methane and mixtures thereof. Preference is given to the oligomeric isocyanurates, uretdiones, allophanates and iminooxadiazinediones of HDI, to the oligomeric isocyanurates, uretdiones and allophanates of IPDI and to the oligomeric isocyanurates of the isomers of bis(4,4'-isocyanatohexyl)methane and mixtures thereof.

Analogously to the above description, suitable polyesters, polycarbonates or polyurethanes are obtainable, for example, by reaction of unsaturated OH-functional compounds having from 2 to 12 carbon atoms, preferably from 2 to 4 carbon atoms, with, for example, acid-, ester- or acid-chloride-functional polyesters or polycarbonates or NCO-functional polyurethanes.

Also suitable are reaction products of polyesters having acid numbers >5 and glycidyl-functional (meth)acrylates (e.g. glycidyl methacrylate). Preferred OH-functional unsaturated compounds for the synthesis of unsaturated polyesters, polycarbonates and polyurethanes are hydroxyethyl acrylate and the isomers of hydroxypropyl acrylate. Particular preference is given to the reaction product of glycidyl methacrylate and acrylic acid.

Polyacrylates can be modified for radiation curing only after polymerisation of the acrylate and vinyl aromatic monomers. This is effected via functional groups that are inert with respect to the preparation conditions of the polyacrylate and are only subsequently modified further to unsaturated radiation-curing groups. Suitable groups for this purpose are, for example, those listed in the following table:

| Inert group | Modifying reagent | Radiation-curing group |
|---|---|---|
| Epoxy | Acrylic acid, dimeric acrylic acid | Acrylate |
| Acid | Glycidyl methacrylate | Methacrylate |
| Acid | Hydroxyalkyl acrylate | Acrylate |
| Alcohol | Maleic anhydride | Maleate |
| Alcohol | Acrylic acid, dimeric acrylic acid | Acrylate |
| Alcohol | Acrylic-functional isocyanate | Urethane acrylate |
| Isocyanate | Hydroxyalkyl acrylate | Urethane acrylate |
| Anhydride | Hydroxyalkyl acrylate | Acrylate |

Photoinitiators D are initiators which can be activated by actinic radiation and initiate free-radical polymerisation of the corresponding polymerisable groups. Photoinitiators are commercially available compounds known per se, a distinction being made between unimolecular (type I) and bimolecular (type II) initiators. (Type I)-systems are, for example, aromatic ketone compounds, for example benzophenones in combination with tertiary amines, alkylbenzophenones, 4,4'-bis(dimethylamino)benzophenone (Michler's ketone), anthrone and halogenated benzophenones or mixtures of the mentioned types. Also suitable are (type II)-initiators, such as benzoin and its derivatives, benzil ketals, acylphosphine oxides, for example 2,4,6-trimethyl-benzoyl-diphenylphosphine oxide, bisacylophosphine oxides, phenylglyoxylic acid esters, camphorquinone, α-aminoalkylphenones, α,α-dialkoxyacetophenones and α-hydroxyalkylphenones. It can also be advantageous to use mixtures of these compounds. Depending on the radiation source used for curing, the type and concentration of photoinitiator must be adapted in the manner known to the person skilled in the art. Further details are described, for example, in P. K. T. Oldring (Ed.), Chemistry & Technology of UV & EB Formulations For Coatings, Inks & Paints, Vol. 3, 1991, SITA Technology, London, p. 61-328.

As component E) there can be present additives or auxiliary agents conventional in the technology of surface coatings, paints, inks, sealing materials and adhesives.

In particular, they are stabilisers, light stabilisers, such as UV absorbers and sterically hindered amines (HALS), also antioxidants and auxiliary substances for surface-coating compositions, for example antisettling agents, antifoams and/or wetting agents, flow agents, plasticisers, catalysts, solubilisers and/or thickeners as well as pigments, colourings and/or delustering agents. The use of light stabilisers and the various types thereof are described, for example, in A. Valet, Lichtschutzmittel für Lacke, Vincentz Verlag, Hanover, 1996.

As component F) there can be present non-functional polymers and fillers for adjusting the mechanical and optical properties. All polymers and fillers that are compatible and miscible with the coating agent are suitable for this purpose. The compounds of component F can be used both as bulk material and in the form of particles having mean diameters in the range from one to 10,000 nanometers, preferably in the range from one to 500 nanometers, particularly preferably in the range from two to 200 nanometers.

Suitable polymeric additives are polymers such as, for example, polyacrylates, polycarbonates, polyurethanes, polyolefins, polyethers, polyesters, polyamides and polyureas.

There can be used as fillers mineral fillers, glass fibres and/or metallic fillers, as are employed in conventional formulations for so-called metallic surface coatings.

The substrate film for the coating composition according to the invention serves as the carrier material for the composite material that is formed and, in addition to general fastness requirements, must possess above all the necessary thermal formability. In principle, therefore, thermoplastic polymers, in particular polyacrylates, polymethacrylates, thermoplastic polyurethanes, polyesters, polyethers, polyolefins, polyamides, copolymers of different polymers and blends of different polymers are suitable.

Thermoplastic polyurethanes, polymethyl methacrylate (PMMA) and modified variants of PMMA, polycarbonates, acrylstyrene-acrylonitrile copolymers (ASA) and mixtures of these polymers are particularly suitable.

The substrate film is preferably used in the form of films having a thickness of from 50 to 5000 μm, preferably from 200 to 2000 μm. The polymer of the substrate layer can optionally contain additives, such as, for example, stabilisers, fillers, such as fibres, and colourings.

On the rear side of the substrate film, that is to say on the surface to which the coating composition is not applied, a thermally formable adhesive layer can optionally be applied. There are suitable therefor, depending on the procedure, melt adhesives or radiation-curing adhesives. In addition, a protective film, which is likewise thermally formable, can be applied to the surface of the adhesive layer.

The film can optionally additionally be coated with thermoplastic surface-coating layers, for example adhesive primers, colour- and/or effect-giving base lacquers. The coating composition according to the invention is then not applied directly to the film but to the thermoplastic surface-coating layers, which have already been applied by conventional methods and dried.

Curing by means of polyaddition reaction is understood as meaning a polyreaction in which a polymeric product forms by the repeated addition of di- or poly-functional monomers, the addition reaction proceeding without cleavage of a low molecular weight compound (see Elias, Makromoleküle, 5th Ed., Vol. 1, p. 220 ff, Hüthig and Wepf, Basle, 1990). Examples of polyaddition reactions are the formation of polyureas and polyurethanes and the reaction of epoxy resins with di- or poly-amines. Preference is given according to the invention to curing by formation of polyurethanes from isocyanates A) and isocyanate-reactive components B).

A block-resistant coating is a coating that does not tend to adhere to itself (see Zorll (Ed.), Römpp Lexikon Lacke und Druckfarben, 10th Ed., p. 81, Georg Thieme Verlag, Stuttgart, 1998).

A thermoplastic substance is a substance which exhibits, above its use temperature, a reversible softening point or range above which it can be mechanically formed, the new form being retained after cooling of the substance below the softening point or range. In general, thermoplastic behaviour of polymeric substances requires a linear and/or branched structure of the polymeric units. Crosslinked polymers, on the other hand, no longer exhibit thermoplastic behaviour even at low degrees of crosslinking, but exhibit duromeric behaviour, that is to say they are not thermally formable at all or only to a small degree.

Curing by means of actinic radiation is understood as being the free-radical polymerisation of ethylenically unsaturated carbon-carbon double bonds by means of initiator radicals which, for example, are liberated from the above-described photoinitiators by actinic radiation.

The invention relates also to a combined method for curing the surface-coating compositions and for post-forming the coating composition according to the invention.

The coating composition according to the invention is first applied to the substrate film (film) by conventional methods such as knife application, roller application, spraying or printing. The applied layer thicknesses (before curing) are typically from 0.5 to 5000 μm, preferably from 5 to 1000 μm, particularly preferably from 15 to 200 μm. When solvents are used, they are removed by conventional methods after application.

This is followed by a first curing step, in which a thermal polyaddition reaction is initiated. Owing to the defined functionality of components A and B of the coating composition, a block-resistant coating having thermoplastic properties is thereby formed.

A thermally formable protective film can optionally be applied to the coated surface before or after the first curing step, in particular when the substrate film used has an adhesive layer on the surface facing the coated surface.

After the first curing step, the coated film can optionally be rolled up, without the coating adhering to the rear side of the substrate film. It is, however, also possible to cut the coated film to size and to feed the cut sections to further processing either individually or in a pile.

After the first curing step, or optionally after rolling up, the coated film can be brought into the desired final form by thermal forming. This can be effected according to conventional processes such as deep-drawing, vacuum forming, pressing, blow moulding (see Lechner (Ed.), Makromolekulare Chemie, p. 384 ff, Verlag Birkenhäuser, Basle, 1993). In addition, the coated film can optionally be used in the heated state for coating objects. An adhesive layer can optionally be inserted as adhesion promoter between the film and the object to be coated.

After the forming step, the coating of the coated film is finally cured by irradiation with actinic radiation. Radiation curing is preferably carried out by the action of high-energy radiation, that is to say UV radiation or daylight, for example light having a wavelength of from 200 to 750 nm, or by irradiation with high-energy electrons (electron radiation, 90 to 300 keV). As radiation sources for light or UV light there are used, for example, medium- or high-pressure mercury vapour lamps, it being possible for the mercury vapour to be modified by doping with other elements, such as gallium or iron. Lasers, pulsed lamps (known by the name UV flashlight radiators), halogen lamps or excimer radiators can likewise be used. The radiators can be installed in a stationary manner, so that the material to be irradiated is moved past the radiation source by means of a mechanical device, or the radiators can be movable and the material to be irradiated does not change position during curing. The radiation dose that is conventionally sufficient for crosslinking in the case of UV curing is in the range from 80 to 5000 mJ/cm$^2$.

The irradiation can optionally be carried out with the exclusion of oxygen, for example under an inert gas atmosphere or an oxygen-reduced atmosphere. Suitable inert gases are preferably nitrogen, carbon dioxide, noble gases or combustion gases. The irradiation can further be carried out by covering the coating with media that are transparent to radiation. Examples thereof are plastics films, glass or liquids such as water.

The type and concentration of the initiator that is optionally used are to be varied or optimised in a manner known to the person skilled in the art by orientating preliminary experiments, according to the radiation dose and the curing conditions. For curing of the formed films it is particularly advantageous to carry out the curing using a plurality of radiators, the arrangement of which is to be so chosen that, where possible, every point of the coating receives the optimum dose and intensity of radiation for curing. In particular, non-irradiated regions (shaded areas) are to be avoided.

Mercury radiators in stationary devices are particularly preferably used for the curing. Photoinitiators are then employed in concentrations of from 0.1 to 10 wt. %, particularly preferably from 0.2 to 3.0 wt. %, based on the solids of the coating. For the curing of such coatings, a dose of from 500 to 4000 mJ/cm$^2$, measured in the wavelength range from 200 to 600 nm, is preferably used.

Before or after final curing, the formed coated film can be modified by spraying or applying a foam to the back thereof using optionally filled polymers, such as thermoplastics, or reactive polymers, such as two-component polyurethane systems. An adhesive layer can optionally be used as adhesion promoter.

Use of the coated film or of moulded bodies produced therefrom:

The formed, coated films can be used in principle in the same manner as uncoated films or films coated after forming. In particular, transparent or partially transparent formed coated films can be used in the production of screens, indicators or displays in electronic devices. They can further be used as labels or signs, for example having partially raised or depressed regions, such as, for example, motor vehicle number plates, but also in the production of credit cards or other cards in which the three-dimensional structure is used as a security feature. Furthermore, they can be used as a replacement for embossed metal, for example for high-quality packaging.

The moulded bodies which have been sprayed on the back or had foam applied to the back can in principle likewise be used as appropriately formed, coated or uncoated plastics parts. The moulded bodies according to the invention can then advantageously be used in particular when a plastics component, owing to its function, requires the advantageous properties (appearance, resistance, fastness to scratching and wear) of a high-quality surface coating, but subsequent surface coating is dispensed with for reasons of cost. Such applications are in particular casings for small electronic devices, such as mobile telephones or telephones, shavers and computers, in particular portable devices which are exposed to particular stresses. The moulded bodies are advantageously used in motor vehicle or aircraft construction, in particular as add-on parts for motor vehicles or bodywork parts.

EXAMPLES

Acid number: given in mg KOH/g sample, titration with 0.1 mol./l NaOH solution against bromothymol blue (ethanolic solution), colour change from yellow through green to blue, based on DIN 3682.

Hydroxyl number: given in mg KOH/g sample, titration with 0.1 mol./l meth. KOH solution after cold acetylation with acetic anhydride with dimethylaminopyridine catalysis, based on DIN 53240.

Isocyanate content: given in %, back-titration with 0.1 mol./l hydrochloric acid after reaction with butylamine, based on DIN EN ISO 11909.

Gel permeation chromatography (GPC): eluant THF, RI detection, integration after calibration with polystyrene standards.

Viscosities: rotary viscometer (Haake, type VT 550), measurements at 23° C.

Unless indicated otherwise, percentages are wt. %.

Components of a Coating Composition

Example 1

Preparation of an Isocyanatoacrylate 9000 g of 4,4'-(2,4'-)diisocyanatodicyclohexylmethane were placed, under nitrogen, in a flat-ground vessel equipped with a stirrer, a reflux condenser, nitrogen delivery, an internal thermometer and a dropping funnel. The mixture was then heated to 60° C., and 28.0 g of a 5% solution of trimethylbenzylammonium hydroxide, dissolved in n-butanol/methanol=12:1, was slowly metered in, the temperature being maintained at from 60 to 80° C. until the NCO content of the crude solution was from 25.5 to 25.8%. 21.0 g of a 5% solution of dibutyl phosphate in 4,4'-(2,4'-)diisocyanatodicyclohexylmethane were then added, cooling was carried out, and 450 g of a commercially available isocyanurate polyisocyanate based on diisocyanatohexane (HDI) (NCO=21.8%, viscosity=3000 mPas/23° C., monomeric HDI=0.1%) were added, and monomeric 4,4'-(2,4'-)diisocyanatodicyclohexylmethane was separated off at 200° C./0.15 mbar by thin-film distillation. 1894.52 g of the solid resin (NCO=15.0%) so obtained were removed and placed, together with 975.00 g of butyl acetate, 3.176 g of dibutyltin dilaurate and 3.18 g of 2,6-di-tert-butyl-4-methylphenol, in a further multi-necked flask which was equipped with a reflux condenser, a dropping funnel, an internal thermometer and a stirrer and through which air was passed (6 l/h), and the mixture was heated to 60° C., with stirring. 374.12 g of hydroxyethyl acrylate were then slowly added dropwise, a maximum temperature of 65° C. being reached. The reaction mixture was then stirred at 60° C. until an NCO content of ≦4.4% was reached.

Characteristic data after 24 hours' storage at RT:

| | Viscosity | Solids content | NCO content | NCO functionality* | Colour index (APHA) |
|---|---|---|---|---|---|
| Example 1 | 7200 mPas | 75.3% | 4.2% | 1.9 | 22 |

*The NCO functionality was determined by evaluation of the GPC on the crude solution of the trimer of diisocyanatodicyclohexylmethane and the HDI isocyanurate polyisocyanate by integration of the trimer, pentamer, heptamer and nonamer signals. From the mathematical isocyanate group functionality resulting from the mixture there was subtracted the proportion consumed by reaction with hydroxyethyl acrylate. The remaining mathematical NCO functionality was indicated.

Example 2

Preparation of an Isocyanatoacrylate 552.0 g of a commercially available isocyanurate polyisocyanate based on diisocyanatohexane (HDI) (NCO content: 23.4 wt. %, viscosity 1200 mPa s at 23° C., monomeric HDI=0.1%) were placed in a multi-necked flask which was equipped with a reflux condenser, a stirrer, a dropping funnel and an internal thermometer and through which air was passed (2 l/h). 1.6 g of 2,6-di-tert-butyl-4-methyl-phenol were added thereto. The solution was heated to 60° C., with stirring. The heat source was removed, and 116.0 g of 2-hydroxyethyl acrylate were added dropwise in such a manner that the temperature was from 55 to 65° C. Further reaction was then carried out at 60° C. until the NCO content was below 12.8%.

Characteristic data after 24 hours' storage at RT:

| | Viscosity | Solids content | NCO content | NCO functionality* | Colour index (APHA) |
|---|---|---|---|---|---|
| Example 2 | 12,650 mPas | 99.8% | 12.7% | 2.1 | 22 |

*The NCO functionality was determined analogously to Example 1.

Example 3

Preparation of an Isocyanatoacrylate 375.00 g of butyl acetate, 642.22 g of a commercially available isocyanurate polyisocyanate based on diisocyanatohexane (HDI) (NCO=21.8%, viscosity=3000 mPas/23° C., monomeric HDI=0.1%) and 0.87 g of 2,6-di-tert-butyl-4-methylphenol were placed at RT in a multi-necked flask which was equipped with a reflux condenser, a stirrer, a dropping funnel and an internal thermometer and through which air was passed (6 l/h), and the mixture was then heated to 60° C. 160.65 g of a reaction product of glycidyl methacrylate with acrylic acid, prepared according to Example 19 of EP-A 1541609, were slowly added dropwise, a maximum temperature of 65° C. being reached. The reaction mixture was then stirred at 60° C. until an NCO content of ≦9.5% was reached. 71.25 g of cyclohexanedimethanol were then slowly added dropwise, a maximum temperature of 65° C. being reached. The reaction mixture was then stirred further at 60° C. until an NCO content of ≦5.6% was reached.

Characteristic data after 24 hours' storage at RT:

| | Viscosity | Solids content | NCO content | NCO functionality* | Colour index (APHA) |
|---|---|---|---|---|---|
| Example 3 | 12,400 mPas | 70.1% | 5.4% | 2.1 | 26 |

*The NCO functionality was determined analogously to Example 1.

Example 4

Preparation of an Epoxy Acrylate 2644.84 g of Eponex® 1510 (Hexion), 17.40 g of triphenylphosphine and 3.48 g of 2,6-di-tert-butyl-4-methylphenol were placed at RT in a multi-necked flask which was equipped with a reflux condenser, a stirrer, a dropping funnel and an internal thermometer and through which air was passed (6 l/h), and the mixture was then heated to 60° C. 834.28 g of acrylic acid were added dropwise at 60° C. over a period of several hours. When the addition was complete, the temperature was raised to 80° C. and maintained until the acid number had fallen to less than 1.5. 1498 g of butyl acetate were then added, and stirring was carried out for 3 hours at 60° C.

Characteristic data after 24 hours' storage at RT:

| | Viscosity | Solids content | Hydroxyl number | Acid number | Colour index (APHA) |
|---|---|---|---|---|---|
| Example 4 | 140 mPas | 70.4% | 137 | 1.4 | 36 |

Example 5

Preparation of an Epoxy Acrylate 2700.06 g of adipic acid and 499.54 g of butanediol were placed at RT in a multi-necked flask which was equipped with a distillation bridge and a stirrer and through which nitrogen was passed (6 l/h), and the mixture was heated at 180° C., with stirring, until an acid number of ≦484 was reached. 2251.88 g of this preliminary product were placed at RT, together with 2735.94 g of glycidyl methacrylate, 9.98 g of triphenylphosphine and 4.99 g of 2,6-di-tert-butyl-4-methylphenol, in a further multi-necked flask which was equipped with a reflux condenser and an internal thermometer and through which air was passed (6 l/h), and the mixture was heated slowly to 80° C., with stirring, and maintained at that temperature until the acid number was constantly ≦20.

Characteristic data after 24 hours' storage at RT:

| | Viscosity | Hydroxyl number | Acid number | Colour index (APHA) |
|---|---|---|---|---|
| Example 5 | 2900 mPas | 216 | 20.5 | 114 |

Example 6

Preparation of a Polycarbonate Diol Based on 3-methyl-1,5-pentanediol 34,092 g of 3-methyl-1,5-pentanediol were placed at 80° C., together with 8.0 g of ytterbium(III) acetylacetonate and 10,223 g of dimethyl carbonate, in a 60 l pressurised reactor equipped with a distillation head, a stirrer and a receiver. The reaction mixture was then heated to 150° C. within a period of 2 hours, under a nitrogen atmosphere, and that temperature was maintained, with stirring and under reflux, for 2 hours, the pressure rising to 3.9 bar (absolute). The cleavage product methanol, in admixture with dimethyl carbonate, was then removed by distillation, the pressure being lowered continuously by a total of 2.2 bar in the course of 4 hours. The distillation operation was then terminated, and a further 10,223 g of dimethyl carbonate were pumped into the reaction mixture at 150° C. and that temperature was maintained, with stirring and under reflux, for 2 hours, the pressure rising to 3.9 bar (absolute). Then the cleavage product methanol, in admixture with dimethyl carbonate, was again removed by distillation, the pressure being lowered continuously by a total of 2.2 bar in the course of 4 hours. The distillation operation was then terminated, and a further 7147 g of dimethyl carbonate were pumped into the reaction mixture at 150° C. and that temperature was maintained, with stirring and under reflux, for 2 hours, the pressure rising to 3.5 bar (absolute). Then the cleavage product methanol, in admixture with dimethyl carbonate, was again removed by distillation, the pressure being lowered to normal pressure in the course of 4 hours. The reaction mixture was then heated to 180° C. in the course of 2 hours and was maintained at that temperature for 2 hours, with stirring. The temperature was then lowered to 130° C., and a stream of nitrogen (5 l/h) was passed through the reaction mixture, while the pressure was lowered to 20 mbar. The temperature was then raised to 180° C. within 4 hours, and was maintained for 6 hours. The further removal of methanol, in admixture with dimethyl carbonate, from the reaction mixture was then carried out.

After aeration and cooling of the reaction mixture to room temperature, a colourless, liquid oligocarbonate diol having the following characteristic data was obtained:

| | | |
|---|---|---|
| hydroxyl number (OHZ) | 173.4 | mg KOH/g |
| viscosity at 75° C., D: 16: | 175 | mPas |
| number-average molecular weight ($M_n$): | 646 | g/mol. |

Example 7

Preparation of a Polycarbonate Diol Based on 1,4-Butanediol and 1,6-Hexanediol 532.8 g of 1,4-butanediol and 698.8 g of 1,6-hexanediol were placed, under a nitrogen atmosphere, in a 4-liter three-necked flask equipped with a stirrer and a reflux condenser, and the mixture was dewatered at 110° C. and 20 mbar for 2 hours. Aeration was then carried out with nitrogen, and 0.3 g of ytterbium(III) acetylacetonate and 1395.0 g of dimethyl carbonate were added, and the reaction mixture was maintained under reflux for 24 hours (110° C. oil bath temperature). The reflux condenser was then replaced with a Claisen bridge, and the resulting cleavage product methanol, and any dimethyl carbonate still present, were distilled off. To that end, the temperature of 110° C. was raised to 150° C. in the course of 2 hours and, when the temperature had been reached, was maintained for 4 hours. The temperature was then raised to 180° C. in the course of 2 hours and maintained for a further 4 hours once it had been reached. The reaction mixture was then cooled to 100° C., and a stream of nitrogen (2 l/h) was passed into the reaction mixture. Furthermore, the pressure was lowered stepwise to 20 mbar, so that the head temperature did not exceed 60° C. during the continuing distillation. When 20 mbar had been reached, the temperature was raised to 130° C. and maintained for 6 hours. After aeration and cooling, an oligocarbonate diol, liquid at room temperature, having the following characteristic data was obtained:

| | | |
|---|---|---|
| hydroxyl number (OHZ): | 108.9 | mg KOH/g |
| viscosity at 75° C., D: 16: | 600 | mPas |
| number-average molecular weight ($M_n$): | 1028 | g/mol. |

Example 8

Preparation of a Urethane Acrylate 4507.15 g of a commercially available isocyanurate polyisocyanate based on diisocyanatohexane (HDI) (NCO content: 23.4 wt. %, viscosity 1200 mPa s at 23° C., monomeric HDI=0.1%), 2970.00 g of butyl acetate, 10.51 g of 2,6-di-tert-butyl-4-methylphenol and 5.26 g of dibutyltin dilaurate were placed at RT in a multi-necked flask which was equipped with a reflux condenser, a stirrer, a dropping funnel and an internal thermometer and through which air was passed (2 l/h), and the mixture was then heated to 60° C. 6007.08 g of a reaction product of glycidyl methacrylate with acrylic acid, prepared according to Example 19 of EP-A 1541609, were slowly added dropwise, a maximum temperature of 65° C. being reached. The reaction mixture was then stirred at 60° C. until an NCO content of ≦0.2% was reached.

Characteristic data after 24 hours' storage at RT:

| | Viscosity | Solids content | NCO content | Colour index (APHA) |
|---|---|---|---|---|
| Example 8 | 3223 mPas | 77.5% | 0.02% | 19 |

Coating Compositions Examples 9-19

Coating compositions were prepared by mixing together the amounts according to the following table (in g), adding 0.75% flow additive Byk 306 (Byk-Chemie, Wesel, DE) and 5% of a 50% solution of photoinitiator Irgacure® 184 (Ciba Specialty Chemistry, Basle, CH), and adjusting to spray viscosity (20-25 s runout time in a flow cup having a 4 mm opening, corresponding to a solids content of about 45-60%) with butyl acetate. Isocyanate-containing and isocyanate-free constituents were not brought together until immediately before application.

| Example | 9 | 10 | 11 | 12 | 13 | 14 | 15 | 16 | 17 | 18 | 19 |
|---|---|---|---|---|---|---|---|---|---|---|---|
| 1 | 1167 | 1167 | 1167 | | | | | | 525 | | |
| 2 | | | | | | | 328 | | | | 164 |
| 3 | | | | 737 | 737 | 737 | | 737 | 368 | 737 | 384 |
| 4 | | | | | | | | | | | 236 |
| 5 | 139 | 139 | 139 | 139 | | 139 | | | | 139 | |
| 6 | | | 164 | 164 | 327 | | | | 309 | 155 | |
| 7 | | 236 | | | | | | | | | 236 |
| 8 | | | | | | | 60 | 162 | 241 | | |
| PES | 202 | | | | | 202 | | | | | |
| CHDM | | | | | | | 71 | 71 | | | |
| DTBL | 300 ppm | 300 ppm | 300 ppm | | | | | | | | |

PES—polyhexanediol adipate (molecular weight about 850 g/mol., OH content 4.2%)
CHDM—1,4-cyclohexanedimethanol (commercial isomer mixture, OH content 24.0%)
DBTL—dibutyltin dilaurate (urethanisation catalyst)

The coating compositions were each applied by means of a spray gun to a polycarbonate/ABS film coated with a commercially available coloured plastics base lacquer from automotive lacquering (Bayfol®TP 231, Bayer MaterialScience AG, Leverkusen, DE; thickness 1 mm, the polycarbonate side was coated), to black-coloured polycarbonate film (thickness 1 mm) and, for determining the resistance to chemicals and scratch resistance, to black, glossy coated metal sheets. The dry layer thickness was in each case about 60 μm. All the coatings were then pre-dried for 10 minutes at ambient temperature and then for 20 minutes at 100° C. in an air-circulating oven. By means of the coated polycarbonate films, after cooling to ambient temperature, the block resistance of the coatings was tested (analogously to DIN 53150, coating against the rear side of the film, round rubber pressure member, d=2 cm, 2 kg load for 60 seconds, evaluation 1=very tacky to 5=dry, unchanged). The bending strength of the coated films was tested by bending round a pipe having a diameter of 8 cm. A coating was said to pass the test when it did not subsequently exhibit any cracks.

The coated films were deep-drawn. The tool used was a stepped pyramid with a vertical and horizontal edge length of in each case about 2 cm. The degree of stretch was determined by measuring the thickness of the film at the various step surfaces, inside and outside edges after deep-drawing. Degrees of stretch >20, >50, >100 or >150% are indicated. Deep-drawing was carried out at a film temperature of 185° C. over a period of about 60 seconds, tool temperature 65° C., without preblowing.

The coatings on the deep-drawn films and the metal sheets were cured by means of a mercury radiator (power 80 W/cm lamp length) with a dose of about 3000 mJ/cm$^2$.

The scratch resistance was determined according to DIN 55668—method of "testing the scratch resistance of coatings using a laboratory washing installation". The degree of gloss of the coating was measured at an angle of 20° before and after scratching and after scratching and 2 hours at 80° C. The resistance to chemicals was tested with 1% sulfuric acid according to the Daimler-Chrysler gradient oven method. The lowest temperature at which damage to the lacquer is discernible after a contact time of one hour is indicated. The first value corresponds to the evaluation one hour after the end of the exposure, the second value 24 hours after the end of the exposure. The resistance of the coatings to solvents was also tested by 100 double strokes (applied pressure about 1 kg) with a cotton wool pad impregnated with acetone. A coating is said to pass the test when it remains perfect after exposure.

| Example | 9 | 10 | 11 | 12 | 13 | 14 | 15 | 16 | 17 | 18 | 19 |
|---|---|---|---|---|---|---|---|---|---|---|---|
| Block resistance | 5 | 4 | 4 | 4 | 4 | 3 | 3 | 4 | 4 | 4 | 3 |
| Bending test | OK | OK | OK | OK | OK | OK | OK | OK | OK | OK | OK |
| Degree of stretch | >150% | >150% | >150% | >50% | >50% | >50% | >50% | >50% | >50% | >50% | >50% |
| Acetone resistance | OK | OK | OK | OK | OK | OK | OK | OK | OK | OK | OK |
| Gradient oven Sulfuric acid | 36/36 | 44/44 | 54/54 | 40/40 | 36/36 | 40/40 | 36/36 | 48/48 | 51/51 | 40/41 | 40/40 |
| Scratch resistance Gloss before scratching | 88 | 87 | 89 | 84 | 78 | 85 | 88 | 87 | 86 | 88 | 81 |
| Gloss after scratching | 47 | 43 | 44 | 77 | 72 | 82 | 64 | 63 | 57 | 75 | 48 |
| Gloss after scratching and 2 hours at 80° C. | 47 | 43 | 44 | 77 | 73 | 81 | 70 | 66 | 66 | 76 | 49 |

The Examples show that the coatings after drying are good to very good in terms of block resistance but are nevertheless still capable of bending. The coatings can be deep-drawn and exhibit high degrees of stretch. After UV curing, the coatings fulfil the demands currently made in the series lacquering of motor vehicle bodies in respect of the tested properties resistance to solvents, resistance to sulfuric acid and scratch resistance.

Example 20

Spraying the Back of a Deep-drawn Polycarbonate/ABS Film Provided with a UV-cured Coating and a Plastics Base Lacquer For spraying on the back, glass fibre mats are first placed over the entire surface of the rear side (ABS side) of the three-dimensional film moulded body. In the second working step, the three-dimensional film moulded body is placed on a suitable heatable moulding die. In the third working step, a liquid 2K PUR system is then sprayed into the cavity that remains between the moulding die and the film moulded body.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. a process for the production of a coated substrate, the process comprising the steps of 1) applying a to a substrate surface coating composition comprising A) one or more compounds containing at least one chemical function a) suitable for polyaddition with component B), said one or more compounds of component A optionally containing ethylenically unsaturated double bonds;

and

B) one or more compounds containing at least one chemical function b) suitable for polyaddition with component A) and which is different from chemical function a), said one or more compounds of component B) optionally containing ethylenically unsaturated double bonds, wherein at least one of components A and B must contain ethylenically unsaturated double bonds;

and optionally

C) ethylenically unsaturated compounds which do not contain isocyanate groups and isocyanate reactive groups, D) photoinitiators, E) additives comprising stabilizers, catalysts and other auxiliary substances F) non-functional polymers and/or fillers, 2) curing the product of step 1) by initiating a thermal polyaddition reaction, 3) bringing the product of step 2) into the desired final form by thermal forming;

4) curing the product of step 3) by irradiation with actinic radiation.

2. The process of claim 1, wherein none of the components capable of crosslinking by a polyaddition reaction has a mean functionality greater than 2.8.

* * * * *